(12) United States Patent
Nagano et al.

(10) Patent No.: US 7,379,902 B2
(45) Date of Patent: May 27, 2008

(54) APPARATUS AND METHOD FOR EDITING AND SELLING CREATURE DATA

(75) Inventors: Tomoaki Nagano, Tokyo-to (JP); Junichi Yoshii, Tokyo-to (JP)

(73) Assignee: Pioneer Corporation, Tokyo-To (JP)

( * ) Notice: Subject to any disclaimer, the term of this patent is extended or adjusted under 35 U.S.C. 154(b) by 875 days.

(21) Appl. No.: 09/991,114

(22) Filed: Nov. 13, 2001

(65) Prior Publication Data

US 2002/0065747 A1    May 30, 2002

(30) Foreign Application Priority Data

Nov. 30, 2000  (JP) .......................... P2000-364742

(51) Int. Cl.
*G06Q 30/00* (2006.01)
(52) U.S. Cl. .......................... 705/26; 705/27; 345/473
(58) Field of Classification Search ............ 705/26–27; 345/473
See application file for complete search history.

(56) References Cited

U.S. PATENT DOCUMENTS

| | | | | |
|---|---|---|---|---|
| 5,629,980 | A * | 5/1997 | Stefik et al. ................. | 705/54 |
| 5,880,731 | A * | 3/1999 | Liles et al. .................. | 715/758 |
| 6,466,213 | B2 * | 10/2002 | Bickmore et al. ........... | 345/473 |
| 6,738,065 | B1 * | 5/2004 | Even-Zohar ................ | 345/473 |
| 6,924,803 | B1 * | 8/2005 | Girling et al. .............. | 345/473 |
| 6,954,728 | B1 * | 10/2005 | Kusumoto et al. ........... | 705/1 |

FOREIGN PATENT DOCUMENTS

| | | |
|---|---|---|
| CN | 1193145 A | 9/1998 |
| CN | 1211330 A | 3/1999 |
| EP | 0 791 901 A2 | 8/1997 |

OTHER PUBLICATIONS

Crabb, Don; "Magic Artist Studio software helps children use their imaginations," Chicago-Sun Times, Sep. 21, 1999, Proquest #46272962, 3pgs.*
MediaBuilder: Internet Archive Wayback Machine, www.archive.org; www.mediabuilder.com, Oct. 19, 2000, 15pgs.*
GIFWorks: "Andover.Net license GIFWorks 3.0 to Lycos' community sites; animation now easy for homepage builders," Business Wire, Jan. 18, 2000, Proquest #48050368, 3pgs.*
Yerton, Stewart; "3-D for the masses . . . ," Timew-Picayune, Jul. 23, 2000; Proquest #56761165, 8pgs.*
Anonymous; "Create animation by building a clip art object piece-by-piece," Inside Microsoft PowerPoint, Apr. 1999, v6i4pg1; Proquest #39444939, 7pgs.*

* cited by examiner

*Primary Examiner*—Robert M. Pond
(74) *Attorney, Agent, or Firm*—Ladas & Parry, LLP

(57) ABSTRACT

A creature data item that is created by a creator through creative activity and an editing material data item that gives an additional feature to the creature data item are registered. The registered creature data item is edited in combination with the registered editing material data item to generate a product data item. Product data items thus generated are presented to clients wishing to utilize them.

13 Claims, 5 Drawing Sheets

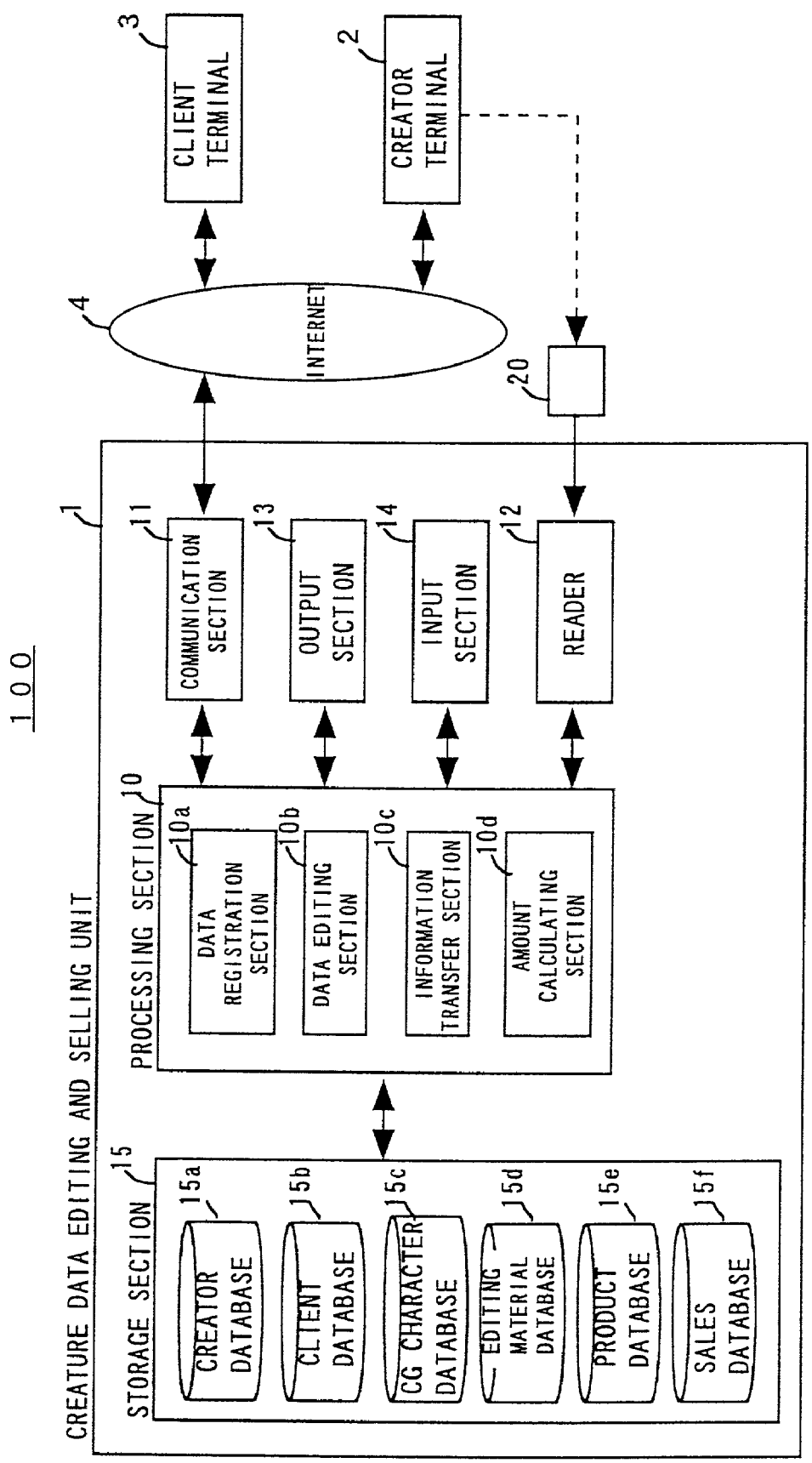

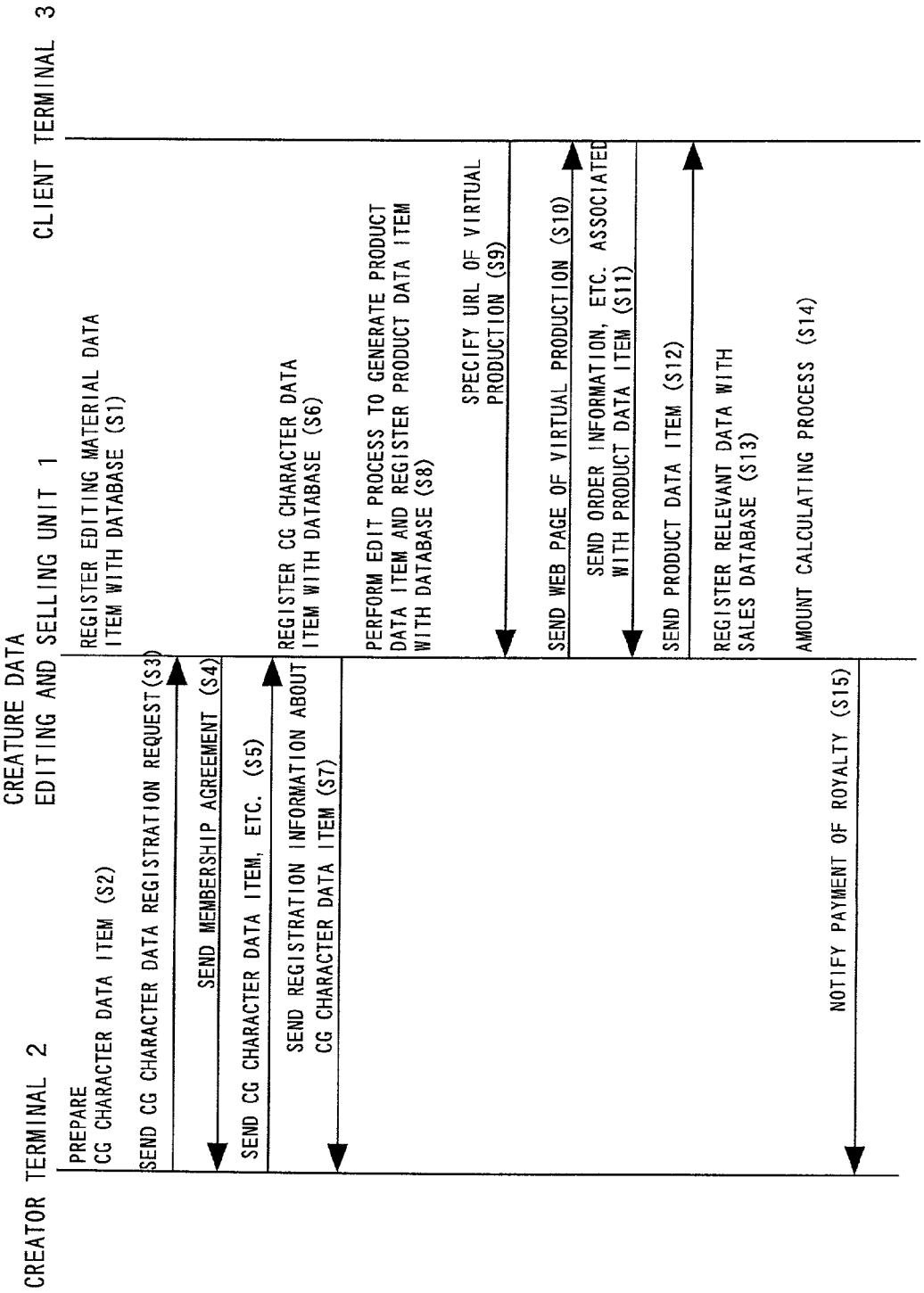

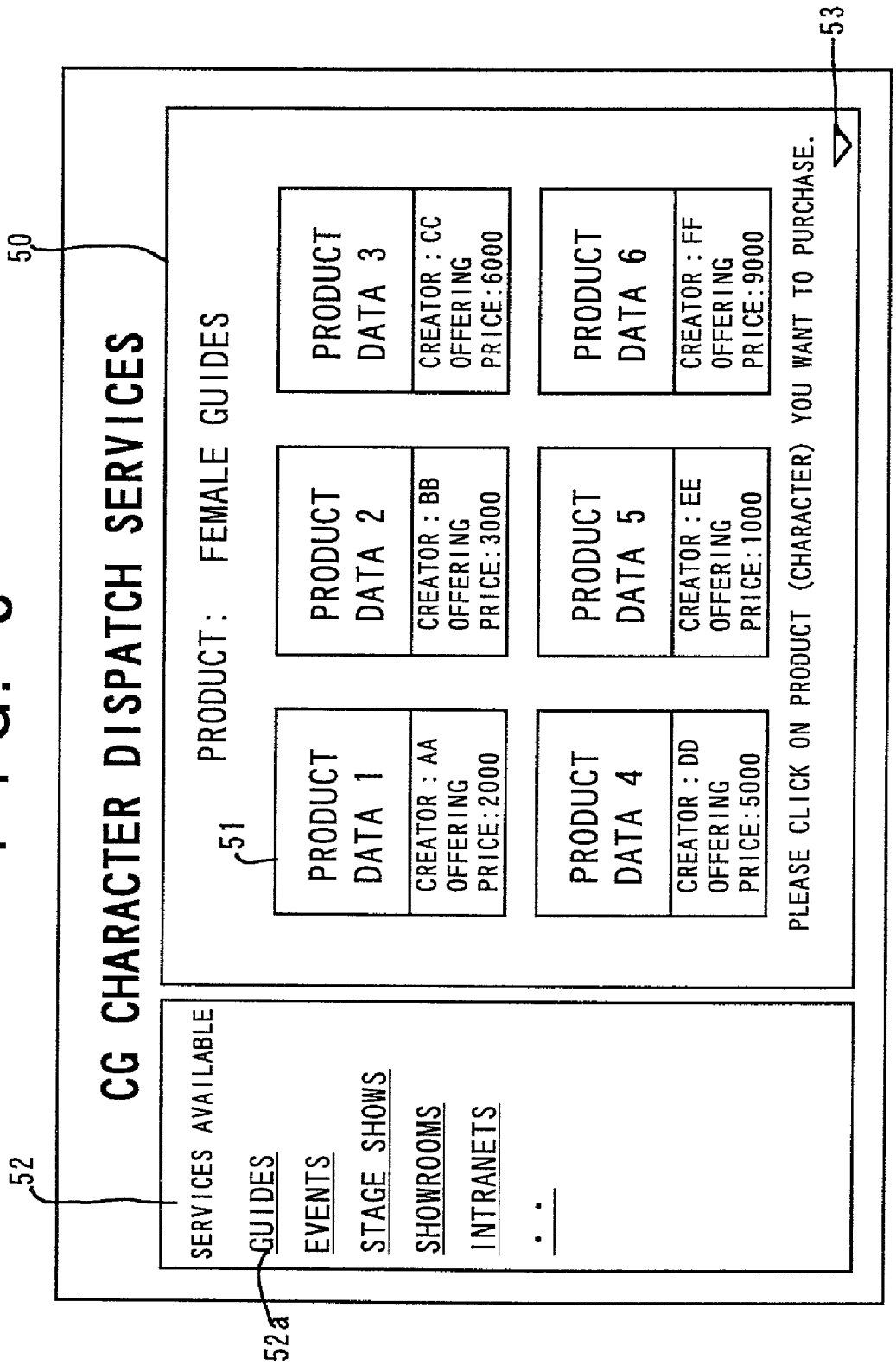

FIG. 5

CG CHARACTER DISPATCH SERVICES

PRODUCT: FEMALE GUIDES

| CG CHARACTER DATA 1 | CG CHARACTER DATA 2 | CG CHARACTER DATA 3 |
|---|---|---|
| CREATOR: AA OFFERING PRICE: 2000 | CREATOR: BB OFFERING PRICE: 3000 | CREATOR: CC OFFERING PRICE: 6000 |

55 — MOTION

STANDING POSITION   WALK FRONTWARD
BOW AT 45 DEGREES   WALK FROM RIGHT TO LEFT
BOW AT 90 DEGREES   WALK FROM LEFT TO RIGHT
EXPLAINING POSITION CHANGE CROSSED LEGS
POINT RIGHTWARD    CROUCHED POSITION
POINT LEFTWARD

PLEASE CLICK ON PRODUCT (CHARACTER) AND MOTION YOU WANT TO PURCHASE.

SERVICES AVAILABLE

GUIDES
EVENTS
STAGE SHOWS
SHOWROOMS
INTRANETS

APPARATUS AND METHOD FOR EDITING AND SELLING CREATURE DATA

BACKGROUND OF THE INVENTION

1. Field of the Invention

The present invention relates to systems capable of editing computer graphics (CG) data.

2. Description of Related Art

Businesses supplying products and services implement advertising via various media, such as television, radio, magazines, papers, Web pages over the Internet, etc. in order to promote the sale and improve the image of their products and services. Many of these businesses employ image characters to increase the impact of their advertising, and, in one aspect, they put such image characters on their Web pages together with an advertisement of their products and services, keeping step with the latest proliferation of the Internet.

In another aspect, CG software (e.g., motion capture, digital mockup, three-dimensional CAD, etc.) becomes increasingly popular among ordinary users, allowing them to easily prepare two-or three-dimensional images on their computer. This implies that potential creators could easily produce image character data derived from the themes, such as humans, animals, or plants, using the CG software.

By the way, many businesses, having difficulty producing these image characters by themselves, outsource such production to specialized entities. Although large businesses could spend much money for the production, medium and small ones, unable to appropriate enough funds, would, in many cases, have to give up the benefits they could otherwise get from image characters.

Many users of the CG software would be eager about winning reputation by creating works, making their works known to the public, and sending them to "stardom". However, they only have a limited chance to make their works public. Moreover, their works, although attractive enough in terms of novelty, still need some elaboration to be sold as "products", thus requiring more expense and time.

SUMMARY OF THE INVENTION

It is therefore an object of the present invention to provide an apparatus and method for editing and selling creature data, which can allow creators to make their own works (creature data) public easily on one hand, and clients to be furnished with the creators' works at a reasonable cost and within a reasonable period, on the other.

The above object of the present invention can be achieved by an apparatus for editing and selling creature data provided with: a creature data registering device for registering a creature data item; an editing material data registering device for registering an editing material data item that gives an additional feature to the creature data item; an editing device for editing the registered creature data item in combination with the registered editing data item to generate a product data item; and a presentation device for presenting the product data item generated by the editing device.

According to the present invention, a creature data item produced by a creator through creative activity, and an editing material data item that gives an additional feature to the creature data item are registered. The registered creature data item is edited in combination with the registered editing material data item to generate a product data item. The product data item is then presented to clients wishing to utilize that product data item. Thus, the creator has a chance to send his/her work (creature data item) to the public easily, and the clients have a chance to obtain the value-added, more useful work produced by the creator.

In one aspect of the apparatus for editing and selling creature data of the present invention, the apparatus is further provided with: an accepting device for accepting a request for purchasing the product data item presented by the presentation device; and a selling device for selling the product data item for which the purchasing request is accepted by the accepting device.

According to this aspect, businesses (clients) are furnished with the value-added, more useful work produced by the creator at a reasonable cost and within a reasonable period.

The above object of the present invention can be also achieved by an apparatus for editing and selling creature data provided with: a creature data registering device for registering a creature data item; an editing material data registering device for registering an editing material data item that gives an additional feature to the creature data item; a presentation device for presenting the registered creature data and editing material data items; an accepting device for accepting selection of the creature data and editing material data items presented by the presentation device; an editing device for editing the creature data item for which the selection is accepted by the accepting device, in combination with the editing material data item for which the selection is accepted by the accepting device, to generate a product data item; and a selling device for selling the product data item generated by the editing device.

According to the present invention, a creature data item produced by a creator through creative activity, and an editing material data item that gives an additional feature to the creature data item are registered. The registered creature data and editing material data items are presented to clients. When selection of the presented creature data and editing material data items is accepted, the selected creature data item is edited in combination with the selected editing material data item to generate a product data item. The product data item is then sold. Thus, the creator has a chance to send his/her work (creature data item) to the public easily, and the clients have a chance to obtain the value-added, more useful work produced by the creator at a reasonable cost and within a reasonable period. Also, both the creature data item and the editing material data item which are before the product data item is generated therefrom are presented, respectively, and hence a greater number of editing combinations can be offered.

In another aspect of the apparatus for editing and selling creature data of the present invention, the editing device edits the creature data item in combination with a plurality of editing material data items to generate the product data.

According to this aspect, the creature data item is edited in combination with a plurality of editing material data items, whereby the creator's work can have more additional features.

In further aspect of the apparatus for editing and selling creature data of the present invention, the creature data item is image data representing a two- or three-dimensional object.

According to this aspect, the clients can obtain three-dimensional image data items for use, for example, in business at a reasonable cost and within a reasonable period.

In further aspect of the apparatus for editing and selling creature data of the present invention, the creature data item is image data representing a character.

According to this aspect, the clients can obtain image characters (based on themes such as humans, animals, plants, buildings, vehicles, and various other objects) for use, for example, in business at a reasonable cost and within a reasonable period.

In further aspect of the apparatus for editing and selling creature data of the present invention, the editing material data item includes at least one of motion data for giving the creature data item an additional feature of motion, voice data for giving the creature data item an additional feature of voice, music data for giving the creature data item an additional feature of music, background data for giving the creature data item an additional feature of background image, and textual data for giving the creature data item an additional feature of textual information.

According to this aspect, the creator's work can have various additional features such as motion, voice, etc.

In further aspect of the apparatus for editing and selling creature data of the present invention, the apparatus is further provided with a remuneration calculating device for calculating, according to sales of a creature data item from which a product data item sold by the selling device is derived, a remuneration for a creator who has prepared the creature data item.

According to this aspect, the creator can be more highly motivated toward creative activity to increase his/her desire to send their works to the public.

In still further aspect of the apparatus for editing and selling creature data of the present invention, the apparatus is further provided with an offering price calculating device for calculating, according to sales of a creature data item from which a product data item sold by the selling means is derived, an offering price of the product data item.

According to this aspect, a product data item derived from a better selling creature data item can be priced higher.

The above object of the present invention can be also achieved by a method for editing and selling creature data provided with: a creature data registering process of registering a creature data item; an editing material data registering process of registering an editing material data item for giving an additional feature to the creature data item; an editing process of editing the registered creature data item in combination with the registered editing material data item to generate a product data item; a presentation process of presenting the generated product data item; an accepting process of accepting a request for purchasing the presented product data item; and a selling process of selling the product data item for which the purchasing request is accepted.

According to the present invention, a creature data item produced by a creator through creative activity, and an editing material data item that gives an additional feature to the creature data item are registered. The registered creature data item is edited in combination with the registered editing material data item to generate a product data item. The product data item is then presented to clients wishing to utilize that product data item. A request for purchasing the presented product data item is accepted, and the product data item for which the purchase request is accepted is sold. Thus, the creator has a chance to send his/her work (creature data item) to the public easily, and the clients have a chance to obtain the value-added, more useful work produced by the creator at a reasonable cost and within a reasonable period.

The above object of the present invention can be also achieved by a method for editing and selling creature data provided with: a creature data registering process of registering a creature data item; an editing material data registering process of registering an editing material data item for giving an additional feature to the creature data item; a presentation process of presenting the registered creature data and editing material data items; an accepting process of accepting selection of the presented creature data and editing material data items; an editing process of editing the creature data item for which the selection is accepted, in combination with the editing material data item for which the selection is accepted, to generate a product data item; and a selling process of selling the generated product data item.

According to the present invention, a creature data item produced by a creator through creative activity, and an editing material data item that gives an additional feature to the creature data item are registered. The registered creature data and editing material data items are presented to clients. When selection of the presented creature data and editing material data items is accepted, the selected creature data item is edited in combination with the selected editing material data item to generate a product data item. The product data item is then sold. Thus, the creator has a chance to send his/her work (creature data item) to the public easily, and the clients have a chance to obtain the value-added, more useful work produced by the creator at a reasonable cost and within a reasonable period. Also, both the creature data item and the editing material data item which are before the product data item is generated therefrom are presented, respectively, and hence a greater number of editing combinations can be offered.

BRIEF DESCRIPTION OF THE DRAWINGS

FIG. 1 is a block diagram illustrating the configuration of a creature data editing and selling system embodying the invention;

FIG. 2 is a flowchart illustrating the operation of the system of FIG. 1 performed when a CG character dispatch service is rendered;

FIG. 3 illustrates a sample Web page displaying product data items on a monitor of a client terminal appearing in FIG. 1;

FIG. 4 illustrates a sample Web page in which a client utilizes a purchased product data item; and FIG. 5 illustrates a sample Web page displaying CG character data items and motion data items on the monitor of the client terminal.

DETAILED DESCRIPTION OF THE PREFERRED EMBODIMENTS

Referring now to FIG. 1, the configuration of a creature data editing and selling system 100 embodying the invention will be described.

As shown in the figure, the system 100 comprises a creature data editing and selling unit 1 as an apparatus for editing and selling creature data, a creator terminal 2, and a client terminal 3, which are interconnected via the Internet 4. Although only one creator terminal 2 and one client terminal 3 are shown in the illustrated embodiment, a larger number of terminals 2 and 3 are actually connected.

The creature data editing and selling unit 1 is provided with a processing section 10, a communication section 11, a reader 12, an output section 13, an input section 14, and a storage section 15, and the creature data editing and selling unit 1 is managed and operated by a Virtual Production that renders services for picking out, editing, managing, and selling (i.e., dispatching) creature data items. In the illustrated embodiment, "a creature data item" is construed as being image data representing a character created by a creator in the form of a two- or three-dimensional CG image utilizing a computer (hereinafter referred to as "CG character data item"). The character is an image character derived from themes including humans, animals, plants, buildings, vehicles, and various other objects.

The creator terminal 2, which can be a known personal computer including input/output sections, is used so that a user can prepare CG character data items. The terminal 2 is provided with a known function for creating CG character data items and a function for data communication with the creature data editing and selling unit 1 over the Internet 4.

The client terminal 3, which can also be a known personal computer including input/output sections, is used by a client desiring to employ CG character data items for business, for example, on pages of the multimedia-supporting World Wide Web (WWW) over the Internet 4, or in promotion videos for introducing their products, etc. The client terminal 3 comes with a Web browser for viewing Web pages.

In the above configuration, a CG character data item created by the creator and prepared through the creator terminal 2 is transmitted to the Virtual Production. For example, the creator transmits the CG character data item to the creature data editing and selling unit 1 via the Internet 4 from the creator terminal 2, or stores the CG character data item in a recording medium 20, such as a magneto-optic (MO) disk, and send the recording medium 20 to the Virtual Production.

The Virtual Production in turn causes, after examining CG character data items transmitted from various creators, the creature data editing and selling unit 1 to edit the accepted CG character data items to give additional features (described below) to the data items, so that the Virtual Production can sell (i.e., dispatch) the edited, thus value-added CG character data items as products on its Web page over the Internet 4 through the client terminals 3. Then, the client having purchased one of the value-added CG character data items displays the purchased data item on its Web page over the Internet 4 to promote and sell its product or improve the image of its product. That is, the creature data editing and selling unit 1 operated by the Virtual Production has a feature of rendering services for dispatching CG characters (hereinafter referred to as "CG character dispatch service") between creators and clients, whereby the creators have a chance to make their works (CG characters) public without much cost and time on one hand, and the clients have a chance to acquire and utilize CG characters (value-added CG characters) fit for their image at a reasonable cost and within a reasonable period on the other.

Referring again to FIG. 1, the creature data editing and selling unit 1 will be described in detail.

The processing section 10 of the unit 1 shown in FIG. 1, which is constructed of a CPU, includes a data registration section 10a as a creature data registering device, and an editing material data registering device, a data editing section 10b as an editing device, an information transfer section 10c as a presentation device, an accepting device, and a selling device, and an amount calculating section 10d as a remuneration calculating device and an offering price calculating device. These components will be described below whenever appropriate. The communication section 11 includes a modem to exchange various information with the creator and client terminals 2 and 3, etc. over the Internet 4. The reader 12 can be a MO disk drive, CD-ROM drive, DVD-RAM drive, or floppy disk (FD) drive, for example, and reads various data stored in a recording medium such as a MO disk, CD-R, DVD-RAM, or FD. The output section 13, which can be a known monitor, such as a CRT or an LCD, and speakers, displays CG characters, etc. and playbacks voice and music. The input section 14, which can be a keyboard, a numerical pad, a mouse, a track ball, etc., allows an operator to enter a predetermined instruction.

The storage section 15, which can be a known random-access storage device, such as a hard disk drive, an IC memory, a magnetic disk drive, a MO disk drive, stores an operating system as a program needed to control the operation of the CPU. The section 15 also stores Web page data for the Virtual Production in the form of HTML (Hyper Text Markup Language), WML (Wireless Markup Language), XML (Extensible Markup Language), or a text format. The storage section 15 also logically builds a creator database 15a, a client database 15b, a CG character database 15c, an editing material database 15d, a product database 15e, and a sales database 15f.

The creator database 15a stores private information about creators who made a contract for subscribing to the creature data editing and selling system 100, the information including creator ID, password, name, address, telephone number, electronic mail address, and royalty to be paid (described below) associated with each creator. These information is registered with the creator database 15a by the data registration section 10a. The section 10a also handles management over copyrights of the CG character data created by subscribing creators, in the creator database 15a.

The client database 15b stores private information about clients having made a contract for subscribing to the creature data editing and selling system 100, the information including client ID, password, name, address, telephone number, electronic mail address, usable period for a purchased product data item (described below) associated with each client. These information is registered with the client database 15b by the data registration section 10a.

The CG character database 15c stores the CG character data item associated with each creator ID assigned to each creator. The CG character data item is transmitted from the creator terminal 2 to the creature data editing and selling unit 1 via the Internet 4 for storage in the database 15c by the data registration section 10a of the processing section 10. The CG character data item can also be sent to the unit 1 after stored in the recording medium 20, so that the sent data item is read by the reader 12 and then stored in the database 15c by the data registration section 10a.

The editing material database 15d stores material data for editing CG character data (hereinafter referred to as "editing material data item"), i.e., editing material data items for giving additional features to a CG character data item to generate a value-added CG character data item. The editing material data items include motion data for giving an additional feature of motion to a CG character data item, voice data for giving an additional feature of voice to a CG character data item, music data for giving an additional feature of music to a CG character data item, background data for giving an additional feature of background image to a CG character data item, and textual information data for giving an additional feature of textual information to a CG character data item. Each of editing material data items is read, for example, by the reader 12, and then stored in the editing material database 15d by the data registration section 10a.

The "motion data" herein used means data obtained by dividing each of images respectively representing various objects into a plurality of components (hereinafter referred to as "levels"), for setting the position and rotation of each level. A set of motion data items representing a series of motions of one level consists of a plurality of frames, and each motion data item sets the motion (position and rotation) of each level corresponding to a single frame. For example, a model of a human being is divided into 17 levels including waist, chest, head, arms, and legs. The waist, which is level 1, can be moved in the x-, y-, and z-axis directions and rotated about the x-, y-, and z-axes. Levels 2 to 17 each are linked to level 1 or other levels by joints, and can be rotated about the x-, y-, and z-axes with the relevant joints as a reference. The motion data can be generated by a known motion capture technique, or otherwise by calculating numerical data and entering the calculated data moment by moment.

The textual data includes a description of products displayed on a monitor screen, for example. The voice data includes a description of products output from the speakers, for example. The music data includes various kinds of music output from the speakers, for example. The background CG data includes data displayed as background images on the monitor screen, for example.

The product database 15e stores the product data item associated with each creator ID, the product data item being a value-added CG character data item generated by the editing process of combining a CG character data item with an editing material data item or items. The product database 15e also stores offering prices, one being associated with each product data item. The editing process of combining a CG character data item with an editing material data item or items is performed by the data editing section 10b.

For example, when the data editing section 10b edits a three-dimensional CG character data item in combination with motion data, an additional feature of motion is given to the three-dimensional CG character. In this case, the data editing section 10b divides the three-dimensional CG character data item into configuration data consisting of a plurality of levels, for example. If the three-dimensional CG character represents a model of a human being, for example, the model is divided into configuration data consisting of 17 levels including waste, chest, head, arms, and legs, and assigns to each level of the configuration data vertex coordinate data and polygon link data. The vertex coordinate data consists of a plurality of vertex coordinates, and the polygon link data consists of a plurality of polygon data items. Each polygon data item consists of surface data and vertex numbers. The surface data includes surface color, ambient, transparency, and data instructing whether or not a texture is pasted to the surface. The vertex coordinates indicate the vertices forming each surface. That is, the configuration data is prepared to correspond to the above-mentioned motion data, and the configuration data is edited in combination with the motion data, whereby motion is given to the three-dimensional CG character to animate the character on a monitor screen, for example. In one embodiment, the creator may prepare the configuration data and send the prepared data to the Virtual Production for subsequent editing process by the Virtual Production.

In order to "edit configuration data to correspond to motion data", the number of levels must be properly matched between the configuration data and motion data concerned, and motion must be within a proper range. For example, configuration data for a character having fingers must be combined with motion data for fingers, or configuration data for a character having a one-piece chest/waist configuration must not be combined with motion data for moving the chest and motion data for moving the waist. Also, the head should be inclined with respect to the chest at 45 degrees or less, and its angle of rotation should be up to 180 degrees, for example. If one creator produces both a CG character data item and motion data item(s) for that character, it would be easier to edit these two types of data in harmony. Otherwise, it would not be so easy. In the latter case, the Virtual Production intervenes to arrange the CG character data item whenever appropriate. The Virtual Production and the creators must agree to make such an arrangement under their contract. In one embodiment, the number of levels, the size of each level, the movable range, etc. may be defined or standardized. In the standardization approach, configuration data can be combined with motion data more easily.

When the data editing section 10b edits a CG character data item in combination with motion data and textual data, the CG character, which is given additional features of motion and text, can move over a monitor screen, with a words balloon for describing a product displayed near the character, for example. When the data editing section 10b edits CG character data in combination with motion data, voice data, and music data, the CG character, which is given additional features of motion, voice, and music, can move over the monitor screen, together with voice for describing a product and background music both output from the speakers, for example. The product data item generated in this way is stored in the product database 15e by the data editing section 10b.

The product data item registered with the product database 15e is then presented on a Web page of the Virtual Production over the Internet 4, by the information transfer section 10c of the processing section 10. That is, the information transfer section 10c has a function of presenting product data items to clients over the Internet 4, whereby a request for purchasing one of the product data items can be received from clients via the client terminals 3 to sell (i.e., transmit) that product data item.

The information transfer section 10c also has a mail server function so that the creator terminals 2 and the client terminals 3 can exchange electronic mail and other information with one another.

The sales database 15f stores sales results of product data items. The sales results are managed for each CG character data, each editing data such as motion data, and each creator respectively associated with the product data item sold. The amount calculating section 10d of the processing section 10 calculates a royalty to be paid according to the sales of each CG character data item by referencing the sales database 15f. The amount calculating section 10d also calculates the offering price of each product data item as a value-added CG character data item according to the sales of each associated CG character data item.

Referring next to FIGS. 1 to 4, the operation of the creature data editing and selling system 100 will be described. FIG. 2 is a flowchart illustrating the operation performed to render a CG character dispatch service.

First, when an operator at the Virtual Production causes the reader 12 to read an editing material data item from, for example, the recording medium 20 to enter the data item into the creature data editing and selling unit 1, the data registration section 10a of the processing section 10 registers the input data item to the editing material database 15d (step S1). Alternatively, the editing material data item can be prepared by the operator interactively over a monitor screen using the input section 14, for subsequent registration with the editing material database 15d.

If a creator, who hit upon an idea of a new CG character, prepared a CG character data item using the creator terminal 2 (step S2), the creator operates the input section of the creator terminal 2 to access the Virtual Production over the Internet 4, and sends a request for registration of his/her CG character data with the relevant database (including creator's private information such as name, address, etc.) to the creature data editing and selling unit 1 via electronic mail (step S3). When the information transfer section 10c of the unit 1 receives the registration request from the creator terminal 2 through the communication section 11, the information transfer section 10c stores that registration request in a mail box, etc., and at the same time, sends a membership agreement to the creator terminal 2 via the Internet 4 (step S4). In the membership agreement, there are checkboxes for placing check marks so that the creator agrees to give the Virtual Production the right to, for example, arrange and/or edit his/her CG character data item, and an area for allowing the creator to enter his/her password.

Next, when accepting the membership agreement, the creator, operating the input section of the creator terminal 2, places a check mark in the relevant checkbox to confirm his/her consent, enters the password, and then returns by electronic mail the membership agreement while attaching CG character data item thereto, to the creature data editing and selling unit 1 via the Internet 4 (step S5). Upon receipt of the returned membership agreement and the CG character data item, the information transfer section 10c of the unit 1 stores them in the mail box, etc., and notifies the data registration section 10a to that effect. Then, the data registration section 10a issues a new creator ID, retrieves the sent CG character data item from the mail box, etc., and associates the retrieved data item with the new creator ID to register that CG character data item with the CG character database 15c (step S6). The data registration section 10a also retrieves the registration request and the membership agreement from the mail box, etc., and associates the information entered therein with the above creator ID to register the entered information with the creator database 15a. The information transfer section 10c sends, along with the creator ID and password, the information that the CG character data item has been registered, to the creator terminal 2 via the Internet 4 (step S7).

In this way, the process of making a contract between the creator and the Virtual Production is completed. From then on, the same creator, if having produced new CG character data, can have such new CG character data item registered with the creator database 15a of the creature data editing and selling unit 1 by merely sending that new CG character data item together with the creator ID and password from the creator terminal 2 to the creature data editing and selling unit 1, while bypassing steps S3 and S4. In one embodiment, the Virtual Production may examine the quality for registration as to each CG character data item sent in step S5, for example, from the viewpoint of novelty, etc., prior to the registration process in steps S6 and S7.

The data editing section 10b of the creature data editing and selling unit 1 then acquires the CG character data item from the CG character database 15c to change its format to one suitable for editing. The data editing section 10b also acquires an editing material data item or items from the editing material database 15d, and edits the CG character data item in combination with the editing material data item or items as mentioned above to generate a product data item. That is, the data editing section 10b generates the product data item by giving an additional feature or features to the CG character data item. The data editing section 10b then stores the generated product data item in the product database 15e (step S8). In this way, each of a multitude of CG character data items created by a multitude of creators is given an additional feature or features to be registered as a product data item. The amount calculating section 10d fixes an offering price for each registered product data item.

Then, when a client desirous to use a CG character data item for business operates the client terminal 3 to specify the URL of a Virtual Production's Web page via the Internet 4 (step S9), the Virtual Production causes, in response thereto, the information transfer section 10c of the creature data editing and selling unit 1 to send to the client terminal 3, along with its Web page, information including product data items and their associated offering prices stored in the product database 15e after conversion into a predetermined Web format (step S10). In this way, product data items are presented to the client for sale. In one embodiment, the information transfer section 10c can send CG character data items stored in the CG character database 15c, and motion data items, etc. stored in the editing material database 15d, as will be described below with reference to FIG. 5. At the client terminal 3, the client downloads an application program (e.g., a Motion Player) for displaying CG character data and motion data in combination, if necessary.

Upon acquisition of the Web page, product data items, etc. sent from the Virtual Production, the client terminal 3 launches its Web browser to display the Web page on the monitor to view the product data items, etc. FIG. 3 illustrates a sample Web page displayed on the monitor of the client terminal 3. In the sample Web page, a product pane 50, provided with areas 51 for displaying a plurality of product data items, displays each associated CG character data item prepared by a creator according to how it is combined with the associated editing material data item or items. For example, as to a product data item which is generated by combining a CG character data item with motion data and textual data is displayed in the relevant area 51 so that the CG character is in a predetermined motion together with a words balloon for giving some descriptions of the product. In the lower part of each area 51, the name of the associated creator and offering price are indicated.

In the same Web page, a service pane 52 is also presented, which lists different types of dispatch services available. For example, if a client wishes to purchase a CG character belonging to a female guide service and clicks on the Female Guides 52a in the list using the input section of the client terminal 3, such as a mouse, for example, product data items based on CG character data belonging to the female guide service are displayed in the product pane 50. An arrow mark 53 indicates that the pane 50 is expandable to show more product data items belonging to the same service. Thus, the client can view other product data items (product data 7 and so on) when clicking on the mark 53 using the input section, such as a mouse.

When the client clicks (selects) a desired product data area 51 using the input section, such as a mouse, an Order Placement page (not shown) appears on the monitor of the client terminal 3. When the client then enters private information (client ID alone if this is the second time for the client to place an order for the CG character dispatch service), usable period of the CG character, payment method, etc. into predetermined input areas, and clicks on the Send button in the Order Placement page by operating the input section of the terminal 3 such as a mouse, the order information (such as the selected number of the CG character, etc.) and other information entered over the Order Placement page are sent from the client terminal 3 to the creature data editing and selling unit 1 via the Internet 4 (step S11). As to the usable period of a CG character item, the client can select one from one month, one year, or unlimited time, for example, and unless selecting the unlimited time, the client decides to renew the usable period every time the selected period expires. If the client dislikes the purchased CG character, the client may return the purchased product data item.

Then, when the information transfer section 10c of the creature data editing and selling unit 1 receives the order information and the entered information, i.e. , accepts the request for purchasing the selected product data item, the information transfer section 10c acquires that product data item from the product database 15e and sends it to the client terminal 3 via the Internet 4 (step S12), whereby the information transfer section 10c sells (i.e., dispatches) the CG character (i.e., the product data item) to the client. If the product data item is generated by editing a CG character data item in combination with motion data, the information transfer section 10c sends a motion engine for moving the CG character on the monitor screen to the client terminal 3 together with the product data item. Thus, the client can easily purchase the desired product data item, i.e., the CG character data item prepared by a creator and given some additional feature(s) by the Virtual Production, through the client terminal 3. FIG. 4 illustrates a sample Web page in which a client utilizes a CG character purchased in this way. As illustrated in the sample Web page, the client displays the purchased CG character 54 to advertise a product on its Web page, whereby the client can promote and sell that product and improve the image of that product. In some other embodiments, product data items could be displayed as animated CG characters on the screens of cellular telephones including those operating under the Personal Handyphone System (PHS), etc.

The client's private information sent from the client terminal 3 in step S11 is registered with the client database 15b by the data registration section 10a. The section 10a also stores information about the sold product data items, along with their associated CG character data items, creator IDs, offering prices, etc. in the sales database 15f (step S13).

Then, the amount calculating section 10d of the processing section 10 references the sales database 15f to calculate a royalty to be paid for each creator according to the sales of his/her CG character data item (step S14), and stores the calculated royalty in the creator database 15a for each associated creator. Thus, the more a creator sells his/her CG character data item, the more he/she would be paid.

The amount calculating section 10d references the sales database 15f to calculate the offering price of each product data item according to the sales of the associated CG character data item, and stores the calculated offering price in the product database 15e for each associated product data item. Thus, the product data item associated with a better-selling CG character data item would be priced higher, for example. The information transfer section 10c of the processing section 10 sends, to the creator terminal 2 used by a creator who prepared a CG character data item associated with the sold product data item, the information that the CG character data item has been sold, along with the current royalty to be paid, via the Internet 4 (step S15). Thus, the creator is informed of how his/her CG character data item is selling and how much he/she would be paid, and this is conductive to stimulating the creator toward producing more CG characters. Steps S14 and S15 may be performed either for each sale or periodically.

The Web page sent in step S10 may be embodied in various ways other than the sample Web page illustrated in FIG. 3. For example, a sample Web page illustrated in FIG. 5 displays CG character data items together with motion data items. This page displays creature data and editing material data items which are before a product data item is generated therefrom, providing a client with a greater number of combinations as editing options. In this sample Web page, inanimate CG characters are displayed in the areas 51, with a list of various optional motions presented in a pane 55 below the areas 51. If the client clicks to select a desired CG character data item and a desired motion (i.e., motion data) using the input section of the client terminal 3, such as a mouse, to send the order information to the creature data editing and selling unit 1 similarly to step S11, then the data editing section 10b edits the received CG character data item in combination with the received motion data to generate a product data item and thereafter sell the generated product data item by transmission. In the sample Web page illustrated in FIG. 5, it would be desirable to verify the integrity of motions resulting from possible combinations of data at the Virtual Production before the page is presented to clients.

As an alternative to the sample Web page of FIG. 5, the client may select a plurality of motions for a CG character to edit a CG character data item in order to generate and sell a product data item in which the CG character is animated more dynamically and successively according to the selected motions. As another alternative, the text describing each motion selectable for a CG character which is displayed in FIG. 5 may be replaced with a skeleton common to all CG characters, so that the skeleton is moved on the monitor screen according to one motion or a series of motions, either of which is selectable.

The product data and CG character data items presented in FIGS. 3 and 5 maybe enlarged/reduced as necessary, or converted into formats complying with generally available plug-in image viewers (e.g., Real Player and Media Player).

As described above, according to the illustrated embodiment, a multitude of CG character data prepared by various creators are picked out and edited into value-added data to render (i.e., to sell/dispatch) services easily to clients desirous to employ CG characters for business, whereby the creators have a chance to make his/her works (CG character data items) public without much cost and time, and the clients can acquire CG characters (value-added CG characters) fit for their image for business applications, etc. at a reasonable cost and within a reasonable period.

In contrast to the illustrated embodiment in which product data generated by the data editing section 10b, or CG character data and editing material data are presented for sale by the information transfer section 10c over the Internet 4, in one embodiment, such data may be presented for sale via various media. For example, broadcasting through communications satellites, broadcasting satellites, etc. may be deployed to transmit product data for display on a television screen so that a client can select a product data item (or the Virtual Production can accept a purchase order) over the screen. The order information about the product data item selected using a remote control, etc. may be transmitted to the creature data editing and selling unit 1 via a public network, and that product data item may thereafter be transmitted (i.e., sold) to the terminal of the client having placed the order via the Internet, for example.

In another embodiment, the creature data editing and selling unit 1 may be installed in an exhibition and spot sale, etc. for product data items (or CG character data items) to display Web pages, such as those of FIGS. 3 and 5, on the monitor screen of the unit 1, whereby the product data, etc. is presented to clients so that the clients can purchase product data items (by recording the product data items into recording media which they brought with them). In still another embodiment, product data, etc. may be delivered to ad agencies for sale through the ad agencies.

Further, in contrast to the illustrated embodiment in which CG character data items are prepared by creators, editing material data items are prepared by the Virtual Production, and both types of data are registered with the relevant databases of the creature data editing and selling unit 1, in one embodiment, the producers of both types of data, i.e., the CG character data items and the editing material data items, may be reversed, or both types of data may be produced by creators only, for subsequent registration with the relevant databases of the unit 1. In the latter case, both types of data may be produced by the same creator or different creators. For example, there could be a motion data creator who acquires motion data items for the dancing and performance created by a dancer, using motion capture.

When a creator prepared an editing material data item, the creator may transmit the prepared editing material data item from the creator terminal 2 to the creature data editing and selling unit 1 via the Internet 4 similarly to the above-mentioned CG character data item, or may store the prepared editing material data item in a recording medium and send the recording medium to the Virtual Production. Also, when a creator prepared an editing material data item, the amount calculating section 10*d* may calculate a royalty to be paid to the creator and the offering price of the associated product data item according to the sales of that editing material data item, similarly to the above-mentioned CG character data item.

In another embodiment, the creature data editing and selling unit 1 may present only CG character data items, i.e., display only CG character data items on a Web page, for example, for asking potential creators to send in their editing material data items, or may present only editing material data items, i.e., display only editing material data items on a Web page (or display motion of the skeleton in the case of motion data) for asking potential creators to send in their CG character data items. According to this embodiment, works can be collected from a greater number of creators for registration, and a wider range of works better fit for the presented CG character data items and editing material data items can be obtained.

Although the creature data item is described as being a CG character data item in the above embodiments, the invention is not limited to these embodiments, but is applicable to any types of creature data items produced by creators.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-364742 filed on Nov. 30, 2000 including the specification, claims, drawings and summary is incorporated herein by reference in its entirety.

What is claimed is:

1. An apparatus for editing images, the apparatus connected to at least one creator terminal and at least one client terminal via a network, the apparatus comprising:
a communication section for receiving at least one image from the at least one creator terminal via the network;
a dividing device for automatically dividing the image into a plurality of components;
an editing data registering device for automatically associating editing data including motion data representing at least one motion, the motion corresponding to at least one component of the image so as to impart motion to that component independent of all other components;
an editing device for automatically combining all registered motion data and all respective components to thereby impart the motion to the image; and
a presentation device for presenting the motion-enabled image to the at least one client terminal via the network for selection of one or more of the associated motion data to thereby display the image exhibiting the selected motion.

2. The apparatus according to claim 1, further comprising:
an accepting device for accepting a request for purchasing the motion-enabled image presented by the presentation device; and
a selling device for selling the motion-enabled image for which the purchasing request is accepted by the accepting device.

3. The apparatus according to claim 2, further comprising a remuneration calculating device for calculating, according to sales of the image from which the motion-enabled image sold by the selling device is derived, a remuneration for a creator who has prepared the image.

4. The apparatus according to claim 2, further comprising an offering price calculating device for calculating, according to sales of the image from which the motion-enabled image sold by the selling device is derived, an offering price of the image.

5. The apparatus according to claim 1, wherein the image represents a two- or three-dimensional object.

6. The apparatus according to claim 1, wherein the associated motion data is applicable to a plurality of different images.

7. The apparatus according to claim 1, wherein the editing data includes at least one of text data, voice data, or music data, and wherein the editing device associates at least one of words, voice, or music to the image together with the motion.

8. An apparatus for editing images, the apparatus connected to at least one creator terminal and at least one client terminal via a network, the apparatus comprising:
a communication section for receiving at least one image from the at least one creator terminal via the network;
a dividing device for automatically dividing the image into a plurality of components;
an editing data registering device for automatically associating editing data including motion data representing various motions, each motion corresponding to at least one component of the image so as to impart motion to that component independent of all other components;
a first presentation device for presenting the image and the various associated motions to the at least one client terminal via the network;
an accepting device for accepting selection of the image and at least one motion from the various motions presented by the first presentation device;
an editing device for automatically combining all selected motion data with all respective associated components to thereby impart the selected motion to the image; and
a second presentation device for presenting the motion-enabled image to the at least one client terminal via the network to thereby display the image exhibiting the selected motion.

9. The apparatus according to claim 8, wherein:
the accepting device accepts selection of various successive motions; and
the editing device generates the image having the various successive motions.

10. The apparatus according to claim 8, wherein the associated motion data is applicable to a plurality of different images.

11. The apparatus according to claim 8, wherein the editing data includes at least one of text data, voice data, or music data, and wherein the editing device associates at least one of words, voice, or music to the image together with the motion.

12. A method for editing images, comprising operating an apparatus to:
receive at least one image from at least one creator terminal via a network;
automatically divide the image into a plurality of components;
automatically associate motion data representing at least one motion with at least one component of the image to impart motion to that component independent of all other components;
automatically combine all components and all respective associated motion data to thereby impart motion to the image; and
present the motion-enabled image via the network to a client terminal for selection of one or more of the associated motion data to thereby display the image exhibiting the selected motion.

13. A method for editing images, comprising operating an apparatus to:
receive at least one image from at least one creator terminal via a network;
automatically divide the image into a plurality of components;
automatically associate motion data representing various motions with at least one component of the image to impart motion to that component independent of all other components;
present the image and the various associated motions to the at least one client terminal via the network;
accept selection of the image and at least one motion from the various motions presented;
automatically combine all selected motion data with all respective associated components constituents of the selected image to thereby impart the selected motion to the image; and
present the motion-enabled image to the at least one client terminal via the network to thereby display the image exhibiting the selected motion.

* * * * *